Nov. 25, 1958  H. KURY  2,862,195
CYLINDRICAL WINDINGS COMPOSED OF PANCAKE
COILS FOR TRANSFORMERS, REACTORS
AND SIMILAR APPARATUS
Filed July 22, 1955

2,862,195

CYLINDRICAL WINDINGS COMPOSED OF PANCAKE COILS FOR TRANSFORMERS, REACTORS AND SIMILAR APPARATUS

Helmut Kury, Nurnberg, Germany, assignor to Siemens-Schuckertwerke Aktiengesellschaft, Erlangen, Germany, a corporation of Germany Application July 22, 1955, Serial No. 523,871

Claims priority, application Germany July 22, 1954

5 Claims. (Cl. 336—180)

The invention relates generally to electrical apparatus having inductive windings and more particularly to cylindrical windings such as pancake coils for transformers, reactors and other similar apparatus.

In the operation of transformers and similar inductive apparatus, when subjected to voltage surges caused by disturbances on the transmission system such as may be caused by lightning strokes, the first turns of the inductive winding may be subjected to voltages of such magnitude that the insulation is broken down and the apparatus rendered inoperative. In order to meet this problem the turns of the inductive windings may be provided with adequate insulation to withstand any voltage surge likely to occur. This method of protecting the end windings with extra insulation proved to be quite expensive and introduced an objectional space factor. In view of these objections, other means of protecting the inductive windings against surge voltages was sought for and the present invention discloses what has been found to be a very satisfactory method. The object of the invention is to provide an adequate effective through capacitance in transformers and other inductive apparatus to so distribute surge voltages to which the apparatus may be subjected that breakdown of the insulation is avoided and continued operation is effected under the ordinary anticipated surge conditions that may exist in transmission systems.

It is also an object of the invention to provide greater through capacitance for the same size of wire and cooling effect than has hertofore been obtained in inductive apparatus by the use of parallel connected pancake coils wound in the same direction, that is, all from the inside to the outside or from the outside to the inside.

Other objects of the invention will in part, be obvious and will in part, appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figure 1:
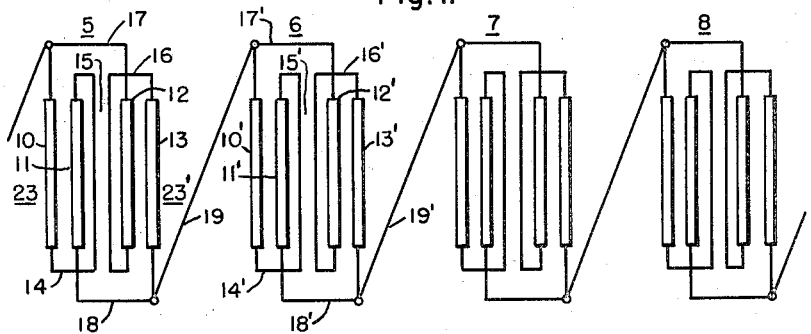
Figure 1 is a diagram of groups of pancake coils showing pairs of interleaved winding turns in each group connected in series circuit relationship and pairs of pancake coils connected in parallel circuit relationship, the groups of parallel connected pancake coils in turn being connected in series circuit relationship.

Referring now to the drawing and Fig. 1 in particular, in the first embodiment of the invention there is illustrated four groups of windings designated generally by the numerals 5, 6, 7 and 8. Each group of windings comprises two pancake coils connected in parallel and each pancake coil is made up of a predetermined number of turns of two conductors arranged in interleaved relationship and connected in series circuit relationship. It is seen from Fig. 1 that current flows in all of the parallel connected coils in the same direction.

In this embodiment of the invention there is illustrated only two pancake coils connected in parallel circuit relationship. However, it is to be understood that any predetermined number of pancake coils could be connected in parallel circuit relationship depending on the design requirements and the capacity required from the inductive apparatus for which the windings are made. Further, there is no limit to the number of groups of pancake coils connected in parallel circuit relationship that may be employed.

Considering now the first group 5 of the windings illustrated in Fig. 1, the rectangles 10 and 11 represent a predetermined number of turns of two conductors wound in interleaved relation to form a pancake coil suitable for inductive apparatus such as transformers, reactors, etc. The rectangles 12 and 13 represent a predetermined number of turns of two other conductors which are wound in interleaved relationship to form a second pancake coil. It should be noted that more than two conductors may be employed and wound in interleaved relationship to form the pancake coils.

Since pancake coils are well known in the art, it will not be necessary to describe their construction and function. When the pancake coil is completed, it simulates an annular member and will be of the required size to fit the winding leg of the core with which it is to be employed. The size of the conductor from which the pancake coils are wound will be dependent upon the design requirements of the apparatus with which it is to be utilized.

Figure 2:
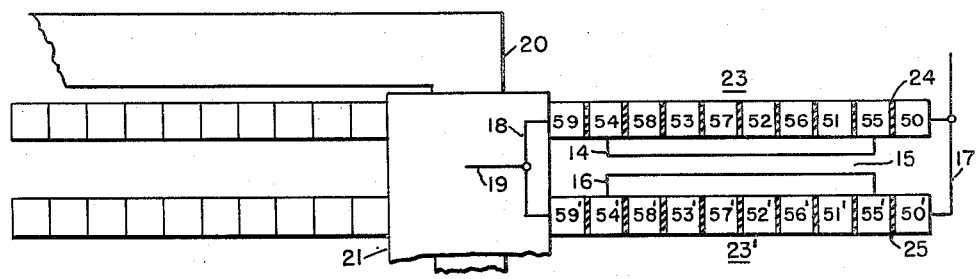
Fig. 2 is a diagrammatic view of a portion of a transformer showing the turns of a pair of pancake coils with the interleaved coils connected in series circuit arrangement and a pair of pancake coils connected in parallel circuit arrangement.

In this embodiment of the invention as shown in Fig. 2, the turns of the conductors 10 and 11 will be interleaved by winding the two conductors from the outside inwardly to the center. As shown, the member 10 comprises the turns 50, 51, 52, 53 and 54 wound together with the group of turns 11 which are designated 55, 56, 57, 58 and 59.

A layer of insulation 24 will be disposed between the turns of the pancake coil as it is wound. The characteristics and thickness of the insulation will depend on design requirements.

The group of windings 5 comprises two pancake coils 23 and 23'. As already described, the pancake coil 23 is made up of the turns of two conductors wound together. These turns 10 and 11 are wound in interleaved relationship and electrically connected in series circuit relationship by the conductor 14. The groups of turns 12 and 13 forming the pancake coil 23' are connected in series circuit relationship by the conductor 16. The pancake coil 23' is made up of the turns 50', 51', 52', 53', and 54' of one conductor and the turns 55', 56', 57', 58' and 59' of a second conductor. The two groups of turns are wound in interleaved relationship as illustrated at 23' in Fig. 2.

Referring now to Fig. 2, a transformer core having a winding leg 20 has a secondary or low voltage winding 21 disposed thereon in any well known manner. The pancake coils 23 and 23' are mounted outside of the secondary winding 21. The two pancake coils 23 and 23' constituting a part of the high voltage winding of the transformer or other inductive apparatus are connected in parallel circuit relationship by means of conductors 17 and 18. As shown in Fig. 1, the conductor 17 connects the upper ends of the groups of turns 10 and 11 while the conductor 18 connects the lower ends of the groups of turns 11 and 13. In Fig. 2 the conductor 17 connects the members 50 and 50' while the conductor 18 connects the turns 59 and 59'.

The group of windings shown generally at 6 includes two groups of turns 10' and 11' wound together in interleaved relationship and connected in series circuit relationship by the conductor 14'. The group of turns 12' and 13' are also wound in interleaved circuit relationship and connected in series circuit relationship by the conductor 16'. The two pancake coils thus formed are connected in parallel circuit relationship by the conductors 17' and 18' in the manner described for the group of windings designated generally by 5. Further, the groups of windings designated generally by 5 and 6 are connected in series circuit relationship by the conductor 19. The group of windings designated generally by 6 is then connected in series circuit relationship with the group of windings 7 by the conductor 19'. As pointed out before, any number of groups of windings may be connected in series circuit relationship to meet requirements.

The pancake coils 23 and 23' are disposed in spaced relationship and form an oil duct for cooling purposes. The duct 15 in group 5 and 15' in group 6 do not have any appreciable electric stress across them and therefore the size is determined solely by mechanical and cooling requirements. The conductors for connecting the groups of interleaved turns in the pancake coils 23 and 23' may be located in the oil duct 15.

Figure 3:
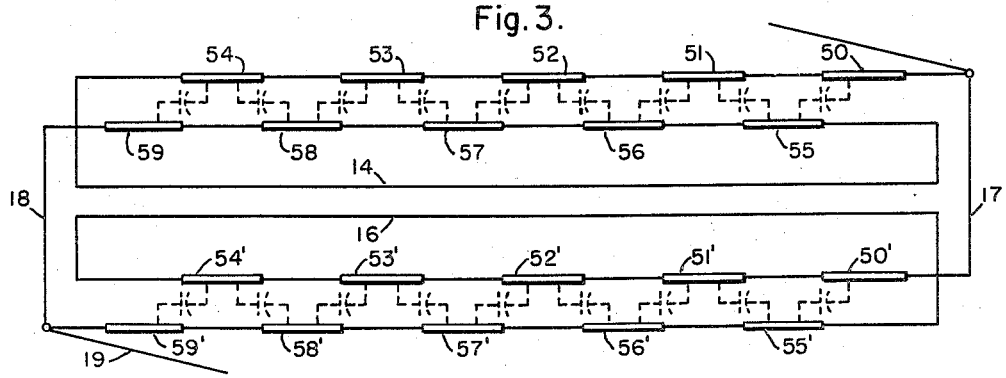
Fig. 3 is a diagram illustrating the capacitance obtained through the interleaving of the turns of the pancake coil with insulation between the turns.

The interleaved turns of the pancake coil 23 and the interleaved turns of the pancake coil 23' are separated by insulation 24 and 25, respectively. This insulation will depend on design requirements. However, it does give the coils a predetermined capacitance. As shown in Fig. 3, the parallel connected pancake coils 23 and 23' give a result similar to the connecting of two capacitors in parallel. Therefore, pancake coils connected in the manner described will give a transformer or other inductive apparatus a greater through capacitance for the same wire size and cooling effect than for transformers having the pancake coils all connected in series circuit relationship.

The diagrammatic showing in Fig. 3 is merely to illustrate the through capacitance in the transformer windings. When pancake coils are wound and mounted in this manner, the surge voltages imposed on the transformer are distributed over the windings effectively and the insulation in the end coils is not stressed excessively and broken down.

Figure 4:
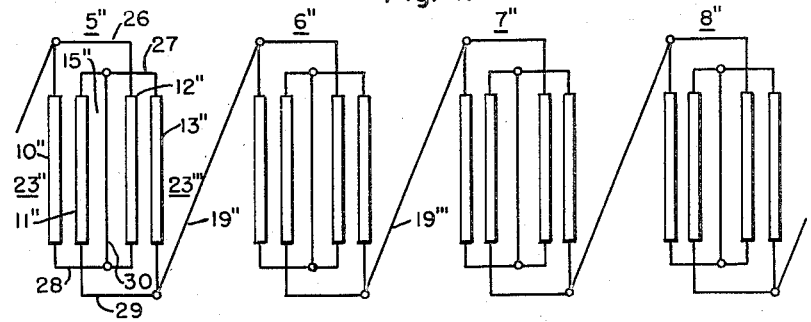
Fig. 4 is a diagram showing pairs of interleaved turns connected in series circuit relationship and the series connected coils in pairs connected in parallel circuit relationship.

In the modification illustrated in Fig. 4, the main difference from that illustrated in Fig. 1 is in the manner of connecting the groups of windings shown generally at 5", 6", 7" and 8" first in series circuit relationship and then the pancake coils in parallel circuit relationship. The groups of turns 10" and 11" constituting the pancake coil 23" and the groups of turns 12" and 13" constituting the pancake coil 23"' are arranged as in Fig. 1. The upper ends of the group of windings 10" and 12" are connected to one another by the conductor 26. The upper ends of the groups of turns 11" and 13" are connected by the conductor 27. The lower ends of the groups of windings 10" and 12" are connected by the conductor 28 while the groups of windings 11" and 13" are connected by the conductor 29. A conductor 30 extending through the oil duct 15' connects the conductors 27 and 28.

As shown, the turns of the windings 10" are connected in series circuit relation with the winding 11" through the conductors 28, 30 and 27. The groups of windings 12" and 13" are connected in series circuit relationship by the conductors 28, 30 and 27. The pancake coils 23" and 23"' are connected in parallel circuit relationship by the conductors 26 and 29. The group of windings 5" and 6" are connected in series circuit relationship through the conductor 19". It is seen from Fig. 4 that current flows in all of the parallel connected coils in the same direction.

The group of windings 6" may be connected to the group of windings 7" by conductor 19"'. In this manner any number of groups of windings may be connected in series circuit relationship.

Since certain changes may be made in the above constrution and different embodiments of the invention could be made without departing from the scope thereof, it is intended that all matter contained in the above description or shown in the accompanying drawings shall be interpreted as illustrative and not in a limiting sense.

I claim as my invention:

1. In an inductive winding for electrical apparatus in combination, a number of pancake coils, each pancake coil comprising a plurality of conductors wound in interleaved relationship, the turns being insulated from one another and connected in series circuit relationship, a plurality of said pancake coils spaced from one another and connected in parallel circuit relationship to provide a group of pancake coils with high through capacitance and a plurality of said groups of parallel connected pancake coils connected in series circuit relationship, said parallel connected coils being so wound and connected that current flows in all of said parallel connected coils in the same direction.

2. In an inductive winding for electrical apparatus in combination, a number of pancake coils, each pancake coil comprising a plurality of conductors wound in interleaved relationship, the turns of each pancake coil being insulated from one another and connected in series circuit relationship, a plurality of said pancake coils disposed in spaced relationship and connected in parallel circuit relationship, an oil duct provided between said pancake coils by disposing them in spaced relationship, the pancake coils connected in parallel circuit relationship constituting a group of coils and a plurality of said groups of parallel connected pancake coils connected in series circuit relationship to form a complete winding, said parallel connected coils being so wound and connected that current flows in all of said parallel connected coils in the same direction.

3. In an inductive winding for electrical apparatus in combination, a predetermined number of pancake coils, each pancake coil comprising a plurality of conductors wound in interleaved relation, insulation disposed between the turns of the conductors to give a through capacitance to the pancake coils, conductors connecting the interleaved turns of the pancake coils in series circuit relationship, a plurality of said pancake coils spaced from one another and connected in parallel circuit relationship to provide a group of pancake coils with high through capacitance, an oil duct formed between said pancake coils by disposing them in spaced relationship, the conductors connecting the interleaved turns of said pancake coils in series circuit relationship being disposed in the oil ducts, and a plurality of said groups of parallel connected pancake coils connected in series circuit relationship to form a winding, the winding having a high through capacitance for distributing surge voltages in the winding, said parallel connected coils being so wound and connected that current flows in all of said parallel connected coils in the same direction.

4. In inductive apparatus provided with a core and an inductive winding, the winding comprising a number of pancake coils, each pancake coil comprising a plurality of conductors wound in interleaved relationship, insulation disposed between the turns of the conductors in each pancake coil giving it a substantial capacitance, conductors connecting the interleaved turns in series circuit relationship, a plurality of said panake coils spaced from one another and connected in parallel circuit relationship to provide a group of pancake coils with high through capacitance, a plurality of said groups of parallel connected pancake coils connected in series circuit relationship, the groups of pancake coils being disposed on the core, and oil ducts provided between the pancake coils by disposing them in spaced relationship, the conductors connecting the interleaved turns of the pancake coils in series circuit relationship being disposed in the oil ducts, said parallel connected coils being so wound and connected that current flows in all of said parallel connected coils in the same direction.

5. In an inductive winding for electrical apparatus, in combination, a plurality of pancake coils, each pancake coil comprising a plurality of conductors wound in superimposed interleaved relationship, insulation disposed between the turns of the conductors thereby giving a substantial through capacitance to the pancake coils, conductor means connecting the interleaved turns of the pancake coils in series circuit relationship, a plurality of said pancake coils connected in parallel circuit relationship to provide a group of pancake coils with high through capacitance, ducts for a cooling medium for controlling the temperature of said pancake coils formed by disposing adjacent pancake coils in spaced relationship, and a plurality of said groups of parallel connected pancake coils connected in series circuit relationship, said winding thereby having a high through capacitance for distributing surge voltages in the winding, said parallel connected coils being so wound and connected that current flows in all of said parallel connected coils in the same direction.

References Cited in the file of this patent
UNITED STATES PATENTS

| | | |
|---|---|---|
| 1,872,247 | Cole et al. | Aug. 16, 1932 |

FOREIGN PATENTS

| | | |
|---|---|---|
| 267,482 | Italy | Sept. 9, 1929 |
| 516,953 | Belgium | Feb. 14, 1953 |